United States Patent
Hartman (10) Patent No.: US 10,783,599 B1
(45) Date of Patent: Sep. 22, 2020

(54) SYSTEM AND METHOD FOR AUTONOMOUS PACKAGE DELIVERY AND COLLECTION

(71) Applicant: William Dean Hartman, Shasta Lake, CA (US)

(72) Inventor: William Dean Hartman, Shasta Lake, CA (US)

(73) Assignee: William Dean Hartman, Shasta Lake, CA (US)

( * ) Notice: Subject to any disclaimer, the term of this patent is extended or adjusted under 35 U.S.C. 154(b) by 0 days.

(21) Appl. No.: 16/449,749

(22) Filed: Jun. 24, 2019

(51) Int. Cl.
| | |
|---|---|
| G06Q 50/28 | (2012.01) |
| G07C 9/00 | (2020.01) |
| B60P 3/00 | (2006.01) |
| G05D 1/02 | (2020.01) |
| B60P 1/00 | (2006.01) |
| B60P 1/36 | (2006.01) |
| G06K 7/14 | (2006.01) |

(52) U.S. Cl.
CPC ............ *G06Q 50/28* (2013.01); *B60P 1/006* (2013.01); *B60P 1/36* (2013.01); *B60P 3/007* (2013.01); *G05D 1/0276* (2013.01); *G07C 9/00309* (2013.01); *G06K 7/1413* (2013.01); *G06K 7/1417* (2013.01)

(58) Field of Classification Search
CPC .......... G06Q 50/28; B60P 3/007; B60P 1/006; B60P 1/36; G07C 9/00309; G05D 1/0276; G06K 7/1413; G06K 7/1417
See application file for complete search history.

(56) References Cited

U.S. PATENT DOCUMENTS

| | | | | |
|---|---|---|---|---|
| 3,442,403 A | * | 5/1969 | Weir | B65G 1/1378 414/281 |
| 3,672,224 A | * | 6/1972 | Starr | G01N 1/20 73/863.92 |
| 3,679,081 A | * | 7/1972 | Duncan, Jr. | B60P 1/36 414/499 |
| 4,722,435 A | * | 2/1988 | Mareels | E05G 1/14 109/25 |
| 2002/0071747 A1 | * | 6/2002 | Fallin | B65G 1/0421 414/281 |
| 2012/0209763 A1 | * | 8/2012 | Zabbatino | G06Q 30/0645 705/39 |
| 2015/0182076 A1 | * | 7/2015 | Berke | A47K 3/281 312/209 |

(Continued)

*Primary Examiner* — Frederick M Brushaber (57) ABSTRACT

An autonomous package handling system includes: one or more autonomous delivery vehicles and one or more locker units. Each autonomous delivery vehicle includes: a motorized conveyor rack, the motorized conveyor rack including a plurality of horizontal conveyors supported by a plurality of support beams; a collection bin for temporarily holding the packages; a vertical lift to move the collection bin between the plurality of horizontal conveyors; a collection bin conveyor configured to extend and retract the collection bin from and back to an interior of the delivery vehicle; and a vehicle wireless unit for communicating with a server. Each locker unit includes: a compartment; a door having an electronic closing and opening mechanism; an electronic lock; a locker wireless unit for communicating with the server; and a locker unit base.

15 Claims, 9 Drawing Sheets

(56) References Cited

U.S. PATENT DOCUMENTS

| | | | | |
|---|---|---|---|---|
| 2015/0369529 A1* | 12/2015 | Monroe | .................... | F25D 3/08 |
| | | | | 62/457.2 |
| 2018/0144300 A1* | 5/2018 | Wiechers | ........... | G06Q 10/0836 |
| 2018/0170675 A1* | 6/2018 | High | .................. | G06Q 10/0832 |
| 2018/0248704 A1* | 8/2018 | Coode | ................ | G07C 9/00944 |
| 2019/0050952 A1* | 2/2019 | Goldberg | ........... | G06Q 30/0635 |
| 2019/0057566 A1* | 2/2019 | Mlynarczyk | ....... | G07C 9/00309 |
| 2019/0143872 A1* | 5/2019 | Gil | ........................ | B60P 1/4421 |
| | | | | 211/86.01 |

\* cited by examiner

SYSTEM AND METHOD FOR AUTONOMOUS PACKAGE DELIVERY AND COLLECTION

REFERENCE TO RELATED APPLICATIONS

This is a first-filed application.

FIELD OF THE INVENTION

The present invention relates to autonomous delivery and pick-up of packages, and more specifically, to systems and methods for transporting packages by an autonomous vehicle or semi-autonomous vehicle to and from a service location constructed for receiving, processing, and storing packages in a controlled manner.

DESCRIPTION OF RELATED ART

Delivery services are a critical component of modern commerce. Most commercial delivery services operate staffed offices which can accept items for shipments, and give verified receipts to the customer. These offices usually have a relatively high overhead cost for the company that operates them, which limits the number of offices that a company can maintain. As a result, customers seeking secure delivery and pickup services may need to drive a long distance to the nearest office and have to wait in line.

Some delivery services operate unattended drop-boxes and (OR) lockers in which a customer may place pre-addressed packages, or collect packages that have been sent to them. It is important for these systems to provide full security and convenience, including verification that the package was deposited or collected. It would also be desirable for packages to be delivered and collected in an autonomous manner or semi-autonomous manner to save cost and prevent human error.

SUMMARY OF THE INVENTION

The objective of the present invention is to provide an automatic package processing, delivery, and collection system. The system may include an autonomous delivery vehicle that has a package delivery and collection system. This vehicle may deliver to (its counterpart) locker system.

In one aspect of the present invention, self-service residential lockers are established. The lockers are configured to store packages to be picked up by the customer or to be collected by the shipping company. The locker units may be equipped with wireless communication capabilities, locker compartments with self-closing/opening doors and electronically controlled locks, alarm siren, barcode and QR Code scanners, cameras, refrigeration capabilities. The locker units may also be self-powered using solar panels. In addition to solar power these self-service residential lockers will include the ability to plug into 110-120 V AC power outlets.

In another aspect of the present invention, an autonomous delivery vehicle is provided. The delivery vehicle is configured to "collect" deliver packages from a shipping facility which may be a parcel company, retail store, manufacturer, distribution center or postal organization to the lockers. The packages may be loaded into the autonomous delivery vehicle the shipping labels will be scanned in by a scanner and the packages will be loaded in a predetermined sequence that corresponds to that vehicle's delivery route. The vehicle has a conveyor rack system that will be loaded for optimal space utilization and delivery/collection efficiency. The vehicle once loaded may have a predetermined delivery and collection route programmed into its software system.

The autonomous delivery vehicle may depart the loading facility and deliver the packages autonomously or semi autonomously. When the vehicle arrives to the first identified locker system, the vehicle may stop in front of the locker system, engage the vehicles' self-leveling device to ensure vehicle is lined up properly with the locker system. The delivery vehicle may send information to the locker system via wireless device containing package and locker information and request the locker unit to unlock and open certain doors in sequence to allow the vehicle to unload specific packages. The delivery vehicle may lower and extend the vehicles' delivery and collection bin that is outfitted with a conveyor, electric motor and pressure sensors that allow the package to travel from the delivery vehicle to the delivery vehicles counterpart locker. The locker unit may communicate to the vehicle with the packages that are as to be collected.

The delivery/collection vehicle may have a collected package area in the vehicle that is filled with collected packages initially. As packages are unloaded spaces are created for packages to be collected. The vehicle may be able to utilize empty conveyor lanes to onboard or load additional packages. This allows the delivery and collection vehicle to return to the vehicles ' point of origin with packages on board.

In some embodiments of the present invention, the delivery mechanism may be hydraulically or pneumatically powered. The conveyor rack containing the first package initiates in forward movement carrying package towards the front of the vehicle to the delivery and collection bin. A scanner may scan the barcode or QR code on the package. Once the package or packages assigned to that delivery has been scanned and carried onto the vertical lift the conveyor rack containing that package(s) will stop preventing any further packages from being delivered. The package(s) may be placed on the vertical lift that allows package(s) to move from conveyor rack to the delivery and collection bin. This vertical lift may stop at each level of the conveyor system inside the autonomous vehicle. Once the package(s) is loaded onto the delivery and collection bin, the bin may be extended from the vehicle via an air powered or hydraulic powered cylinder and is carried into the open locker unit. Once the bin is placed at the delivery point inside the locker system, the delivery and collection bins conveyor may initiate in a forward movement to carry the package(s) into the counterpart locker. The delivery and collection bin conveyor may travel forward to unload the package into the locker. The delivery and collection bin conveyor may also travel in reverse to load packages onto the delivery/collection vehicle. The locker system may scan the package and send a notification through the communication network to the consumer that their package(s) has been delivered. The delivery and collection bin may retract as does the leveling devices by air or hydraulic power into the delivery and collection bins' and leveling devices' original position. The subsequent deliveries of small and large packages will be made in similar manner. On the delivery bin there may be a roll up and down door attached above the door. This roll up and down door may travel in a track that provide security to the packages in the delivery vehicle.

In another aspect of the present invention, the delivery vehicle may be configured to collect packages from the lockers and transport them to central shipping, manufacturing or retail facility. The delivery and collection bin unit may extend from the truck via air power or hydraulic power into a locker compartment that is opened when the delivery vehicle queues the locker the locker unit compartment containing a package that needs to be collected. The delivery/collection bin may have a beveled end that allows it to slide underneath the package. The delivery/collection bin may have a motorized conveyor built into the delivery/collection bin that travels in forward and reverse. The delivery and collection bin may also have pressure sensors located at the end of the bin so that when depressed prevent the delivery and collection bin from extending further. When collecting a package, the delivery/collection bin conveyor may travel in reverse loading the package onto the delivery/collection bin allowing the delivery/collection bin to travel into the delivery/collection vehicle. There may be an electric motor attached to the delivery and collection bin that powers the conveyor belt. This motor works in forward and reverse allowing the delivery and collection bin conveyor to travel in forward or reverse. After the package has been loaded, the bin unit may retract back into the vehicle. As the delivery and collection bin is retracting with the package the locker unit scans the package marking the package as picked up and will transmit signal to the locker to close the locker door and lock the locker door. The collection bin then may retract fully into the delivery/collection bins' original starting position. Subsequent packages are collected in the same manner. Once the delivery/collection bin is back in the delivery/collection bins' original starting position the vehicle will be secure and ready for the vehicles' next assignment. The delivery/collection bin may return to the delivery/collection bins' original starting vertical position. The leveling devices may then be lifted into the original starting position allowing the vehicle to move freely onto the delivery vehicles' next destination.

In another aspect of the present invention, the system comprises a communication unit. The locker system communicates with the delivery vehicle and routes information into the software system. The software system interfaces with manufacturers, shipping companies, postal services and retailers and communicates with the consumer and sends notifications of packages received or delivered.

The above invention aspects will be made clear in the drawings and detailed description of the invention.

DETAILED DESCRIPTION OF THE INVENTION

In the detailed description, numerous specific details are set forth in order to provide a thorough understanding of the invention. However, it will be understood by those skilled in the art that these are specific embodiments, and that the present invention may be practiced also in different ways that embody the characterizing features of the invention as described and claimed herein.

Figure 1:
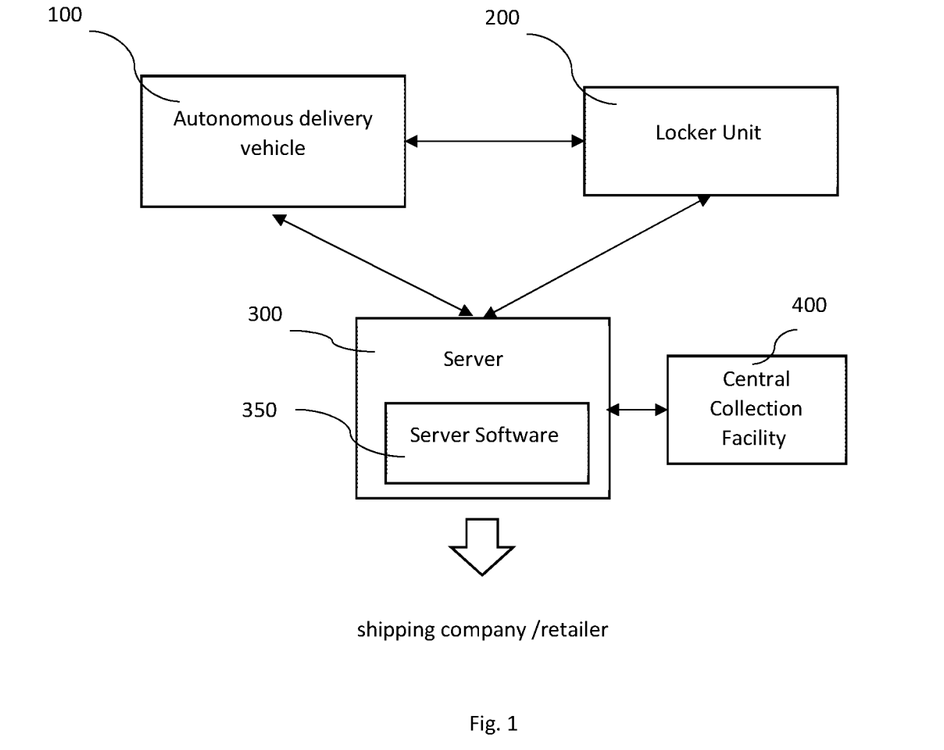
FIG. 1 is a diagram of the overall system setup of the autonomous package delivery and collection system.

FIG. 1 shows an overall system setup of the autonomous package delivery and collection system in certain embodiments. An autonomous delivery vehicle 100 may wirelessly communicate with a central server 300 to receive operation instructions from the server 300 and to transmit the operation status of the delivery vehicle 100 to the server 300. The autonomous package delivery and collection system may also comprise a set of locker units 200, each locker unit 200 assigned to a customer. The locker unit 200 may also wirelessly communicate with the central server 300 to receive operation instructions from the server 300 and to communicate the operation status of the locker unit 200 to the server 300. The server 300 may communicate shipping information to a shipping company, a manufacturer or a retailer. The information may be processed by a server software 350. A central collection facility 400 may be established to serve as a hub for the delivery vehicle 100.

Figure 2A:
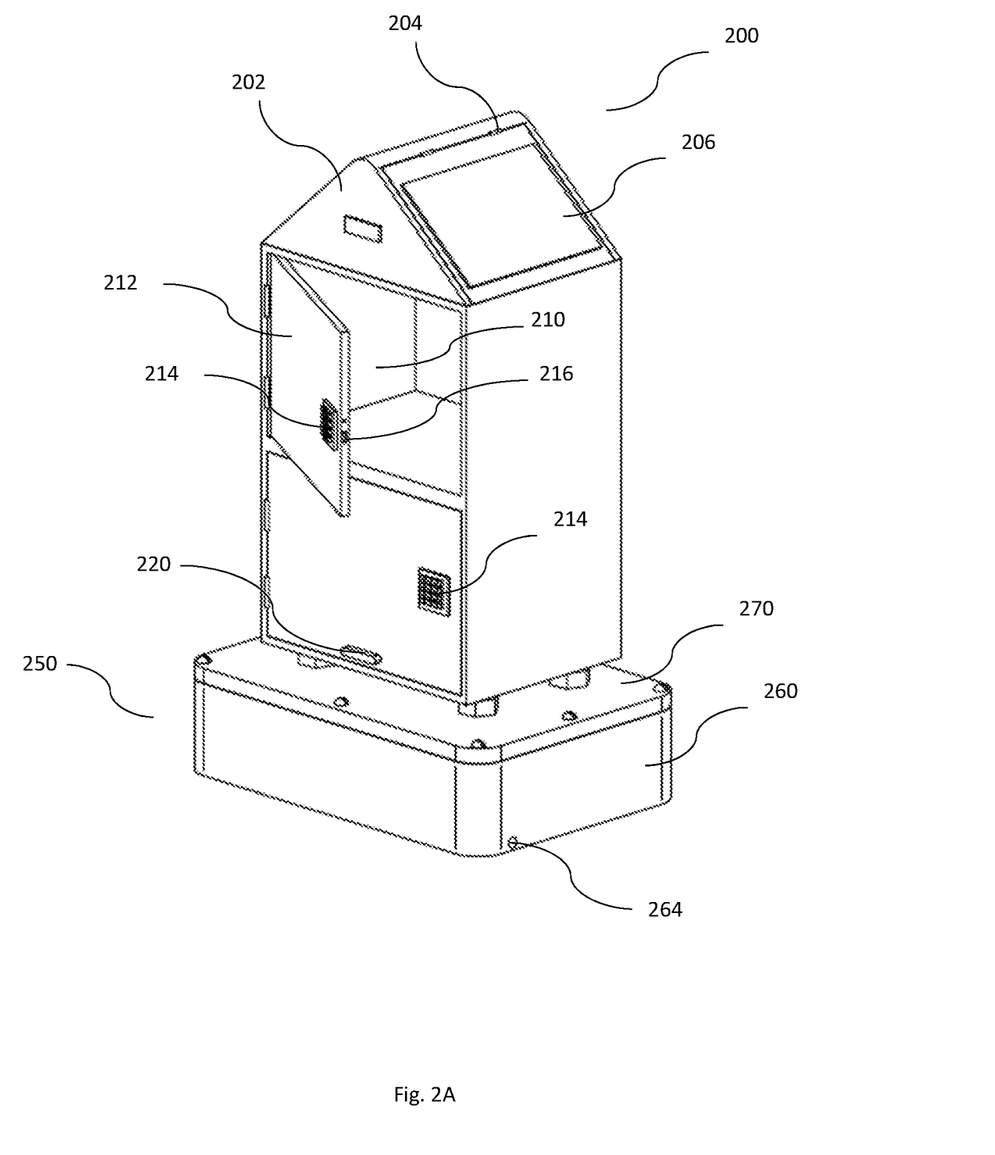
FIG. 2A is a perspective view of an embodiment of a locker unit.
Figure 2B:
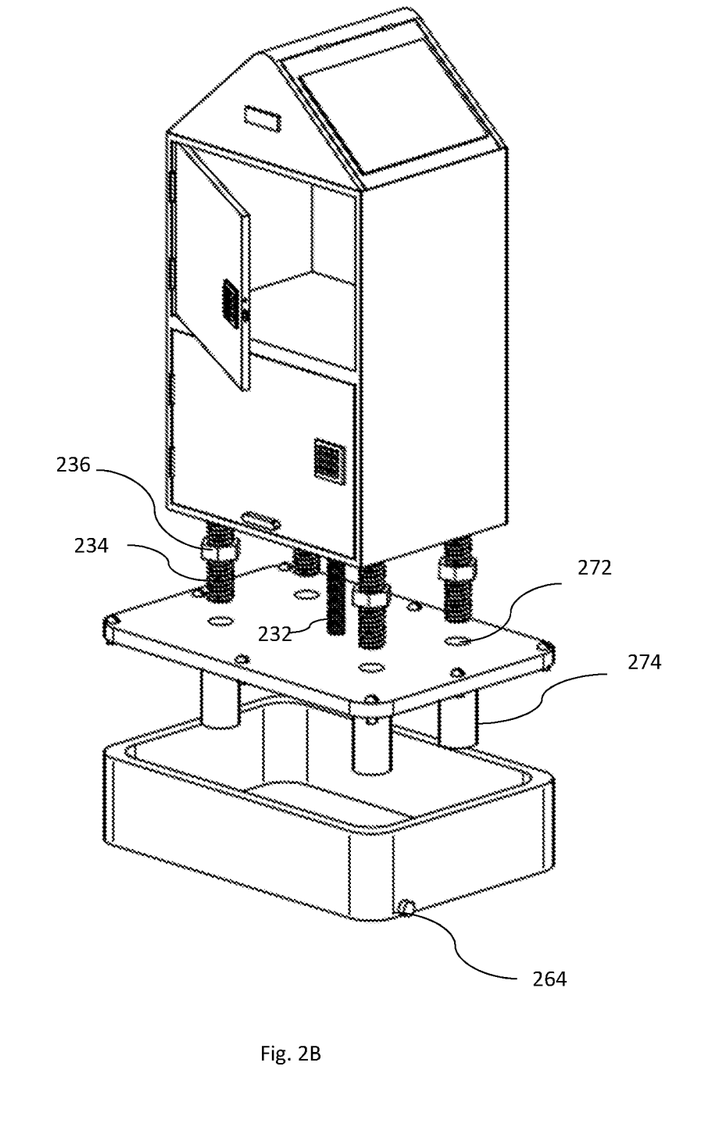
FIG. 2B is a perspective exploded view of the locker unit of FIG. 2A.
Figure 2C:
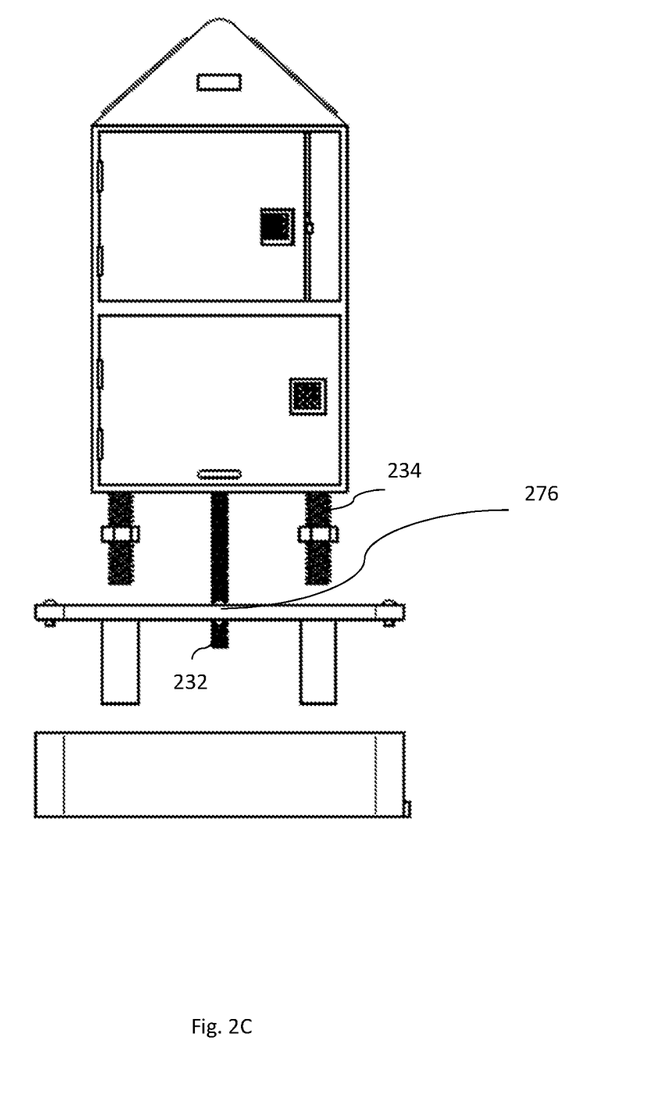
FIG. 2C is an exploded front view of the locker unit of FIG. 2A.

FIGS. 2A-2C show an embodiment of a locker unit 200 and the locker units' base 250. FIG. 2A is a prospective view of the locker unit 200 assembled with the locker units' base 250. FIGS. 2B and 2C show the exploded views of the locker unit 200 and the locker units' base 250. The embodiment of the locker unit 200 in FIGS. 2A-2C has two compartments 205 with doors 212. The compartment doors 212 may have electronic closing and opening mechanism. An electronic lock 216 may be installed on each compartment door 212. The control of the electronic lock 216 may be accessed with wireless connection to lock or unlock. The electronic lock 216 may also be operated by a customer using keypad 216. The roof 201 on the top of the locker unit 200 may provide a space to house multiple additional components. The roof may open on hinges 204 to access those components. The roof 201 may also be equipped with solar panels 206 installed at the top surfaces to power the electrical and electronic components. The locker unit 200 may also be equipped with a level indicator 220 to inform whether the locker unit is installed on a level lateral plane. The level indicator 220 may be implemented as a simple bubble level. The locker unit 200 may further comprise a security bolt 232 and several threaded shafts 234 rigidly fixed housed in and extending from the bottom of the locker unit 200. Each threaded shaft 234 may be matched with an adjustment nut 236. In one embodiment, the locker unit 200 has 4 threaded shafts 234.

The locker unit 200 may be installed on top of a locker unit base 250. The locker unit base 250 may provide stability and security to the locker unit 200. In certain embodiments, the main body of the locker unit base 250 may be made of a durable plastic or cement pad. The locker unit base also be made of concrete or metal. The locker unit base 250 may include a tank 260 with a lid 270 fastened over the top of the tank 260 with screws threaded through small holes on the peripheral of the lid 270. The lid 270 may also have a central aperture 276 and additional circular apertures 272 extended to threaded tubes 274. The security bolt 232 of the locker unit 200 may be fed down through the central aperture 276 into the bottom of the tank 260 to prevent the locker unit from being detached from the locker unit base. The threaded shafts 234 of the locker unit 200 may be fed through the additional circular apertures 272 and threaded tubes 274 of the base lid 270. The threaded shafts 234 may function to level the locker 200 sitting on top of the locker unit base 250 by adjusting the adjustment nuts 236. When the threaded shafts 234 are screwed into the base 250, the adjustment nuts 236 may be threaded onto threaded shafts 234 above base lid 270. The adjustment nuts 236 may have a flat side on them, allowing the flat surface of the nut to rest of the surface of the base lid 270. Once the base lid 270 is attached to the tank 260, the adjustment nuts 236 may be manually turned to travel up or down the threaded shafts 234, causing the shafts to move upward or downward. This process is repeated on each of the threaded shafts 234 and the adjustment nuts 236 until the locker unit 200 is level as indicated by the level indicator 200. the Threaded Shafts may go through the holes in the locker unit base lid and will rest inside of the threaded shaft tubes. The threaded tubes 274 may be used to create a space for the threaded shafts 234 to travel and to provide additional support for the base lid 270.

In certain embodiments, the tank 260 is configured to hold water. The water adds weight to the base 250 to add stability as well as make it harder for someone to remove the locker unit by way of theft from the installation location. To fill the locker unit base 250 with water, a person may simply place a garden hose in one of the threaded tubes. A draining aperture with a drain plug 264 may be configured in the tank 260, allowing the water to be drained from the tank 260.

Figure 3:
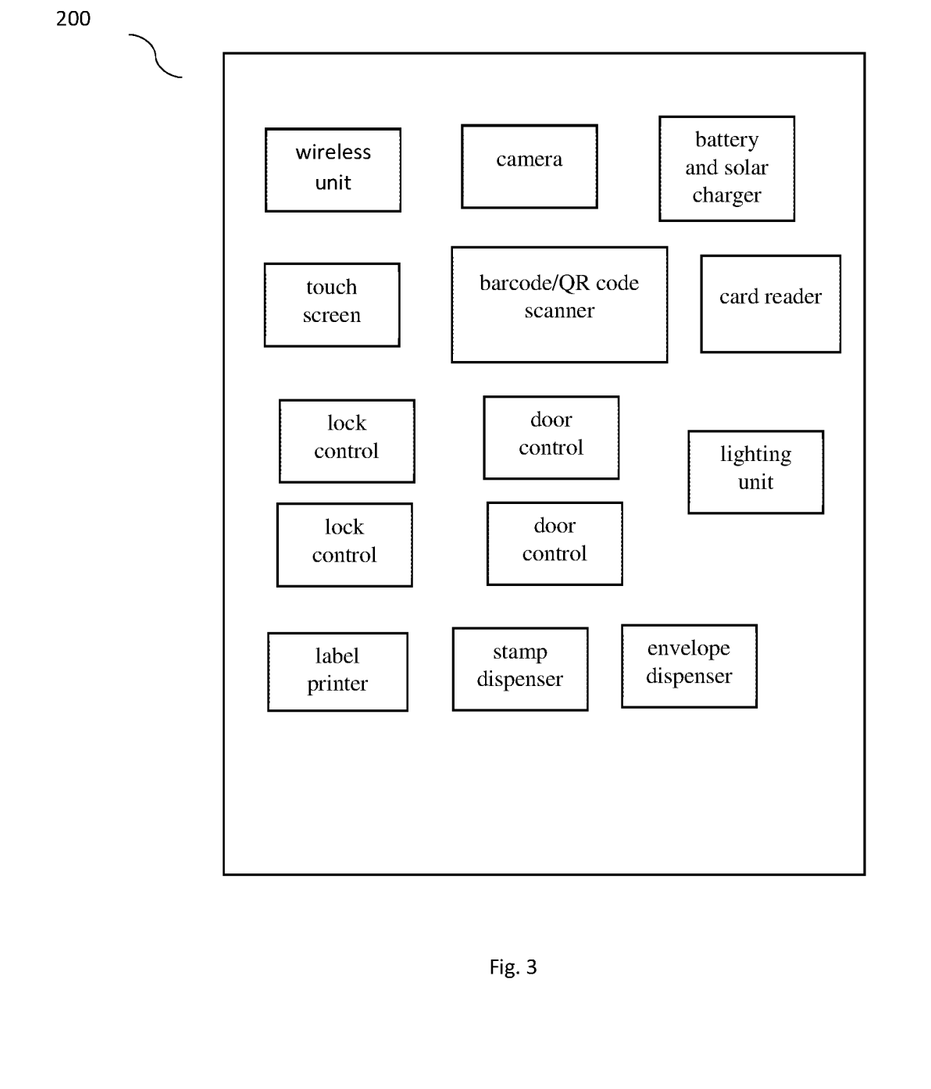
FIG. 3 is a diagram showing additional components of the locker unit.

FIG. 3 shows additional components the locker unit 200 may be equipped with in certain embodiments, including: a wireless unit for wireless communication with the server 300, two lock controls for electrically driving the deadbolts or latches of the electronic locks 216 into locked or unlocked positions, two door controls for opening and closing the compartment doors 212, a light unit for illumination, a battery pack and solar charger, and a camera to monitor relevant activities. The locker unit 200 may further comprise one or more additional components, including: a barcode/QR code scanner, a refrigeration system to provide temperature control for perishable goods, a siren alarm, and infrared sensors.

Figure 4:
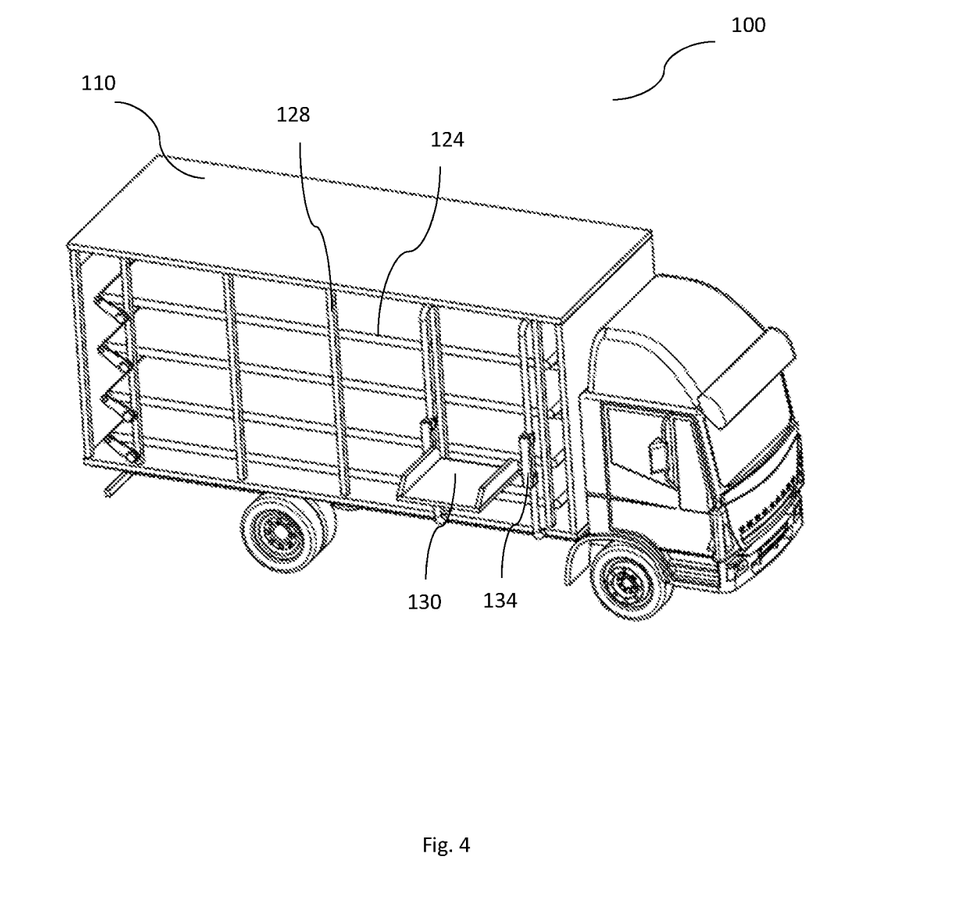
FIG. 4 is a perspective view of an embodiment of the delivery vehicle 0 with one sidewall of the vehicle trunk removed to show the interior.

The autonomous package delivery and collection system also includes a delivery vehicle 100. The delivery vehicle 100 may be an autonomous and unmanned, semi-autonomous, or manned delivery vehicle. The delivery vehicle autonomously or semi autonomously transports packages between the locker units and a central hub/warehouse or retail facility. The delivery vehicle 100 may have one or more doors that open and close at the side end of the vehicle trunk 110. FIG. 4 is an embodiment of the delivery vehicle 100 with one sidewall of the vehicle trunk 110 removed to show the interior. The delivery vehicle 100 is equipped with a motorized conveyor rack system 120 to support and carry cargo packages. The rack system 120 comprises multiple conveyors 124 supported by support beams 128. The delivery vehicle 100 may also include a "vertical lift" delivery/collection mechanism to move packages between the conveyors 124 and the interior of the locker compartments 210. In some embodiments, the vertical lift delivery/collection mechanism comprises a delivery and collection bin 130. The collection bin 130 may move up and down among different conveyors 124 by using a hydraulic lift/lower system 134. The delivery and collection bin 130 may also be equipped with a collection bin conveyor 138 to extend and retract the delivery and collection bin 130 from and back to the interior of the vehicle trunk 110.

In certain embodiments, during a loading or unloading operation, packages may be loaded onto the rack system 120. The vertical lift may travel up and down between the racks of the rack systems. The vertical lift may use a motorized conveyor belt that travels forward and backward and transfers the packages from the vertical lift onto the delivery and collection bin. The delivery and collection bin may be equipped with a second motorized conveyor that transfers the packages from the vertical lift onto the delivery and collection bin and finally into the locker unit assigned for the package to be delivered to.

In certain embodiments, the vertical lift may be equipped with a hydraulic push bar configured to push a package into a dedicated return package location on the conveyor rack system. The return package location may be equipped with a conveyor system to unload the packages from the vehicle when the vehicle arrives at an unloading location.

Figure 5:
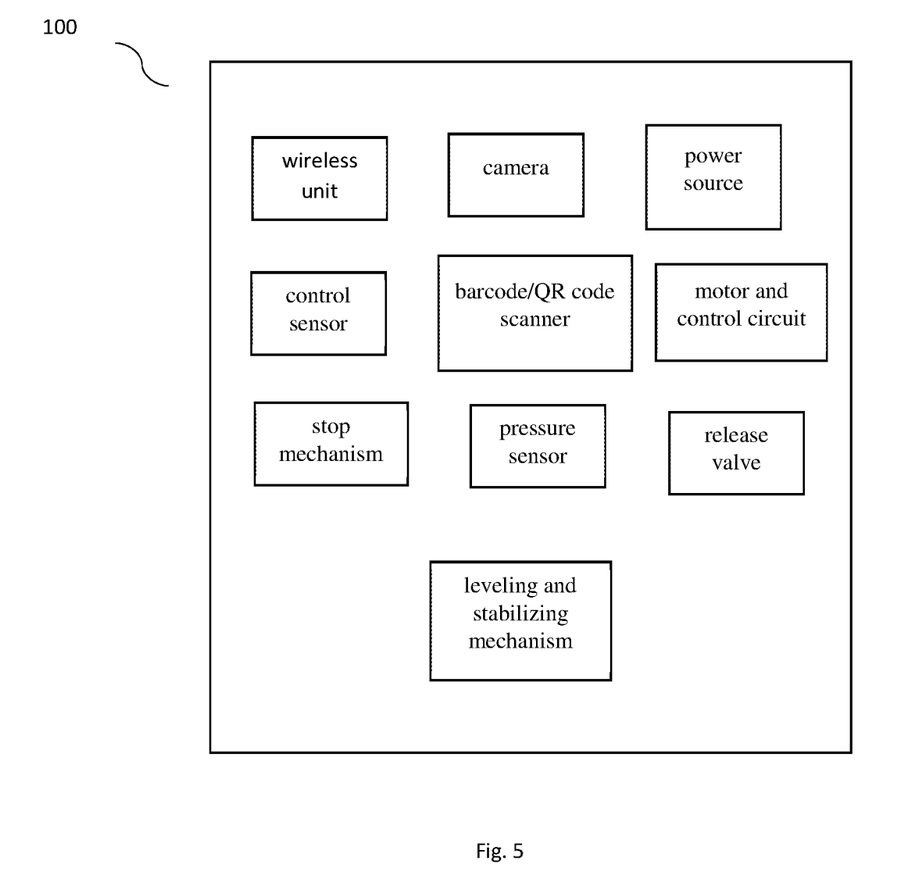
FIG. 5 is a diagram showing additional components of the delivery vehicle.

As shown in FIG. 5, the delivery vehicle 100 may include additional components, including: a wireless unit to communicate with the server 300 and the locker unit 200, one or more power sources, control sensors on the doors, motors, control circuits and driving mechanisms for the doors, conveyors and hydraulic lift and lower system, a stop mechanism that prevents additionally packages from being delivered onto the delivery and collection bin, necessary supply lines, pressure control switches and release valves, barcode/QR code scanners, hydraulic leveling system & stabilizers to lift, lower, or tilt the vehicle 100, and cameras that enable remote monitoring of the operation. The autonomous vehicle may be further equipped with autonomous devices that allow the vehicle to operate autonomously. Alternatively or additionally, the vehicle can be a gasoline powered drivetrain or battery and electric motor drivetrain.

In operation, the delivery vehicle 100 may be loaded at a shipping, manufacturing or retail facility. The packages may be loaded with their shipping labels facing up in a predetermined sequence that corresponds to that vehicle's delivery route. The packages may be scanned in at the time of loading. The rack system 120 inside the vehicle may be loaded with packages on each lanes of each shelf level. Once loaded, the delivery vehicle 100 may be configured with a predetermined delivery and collection route programmed into the delivery vehicles' system.

Figure 6:
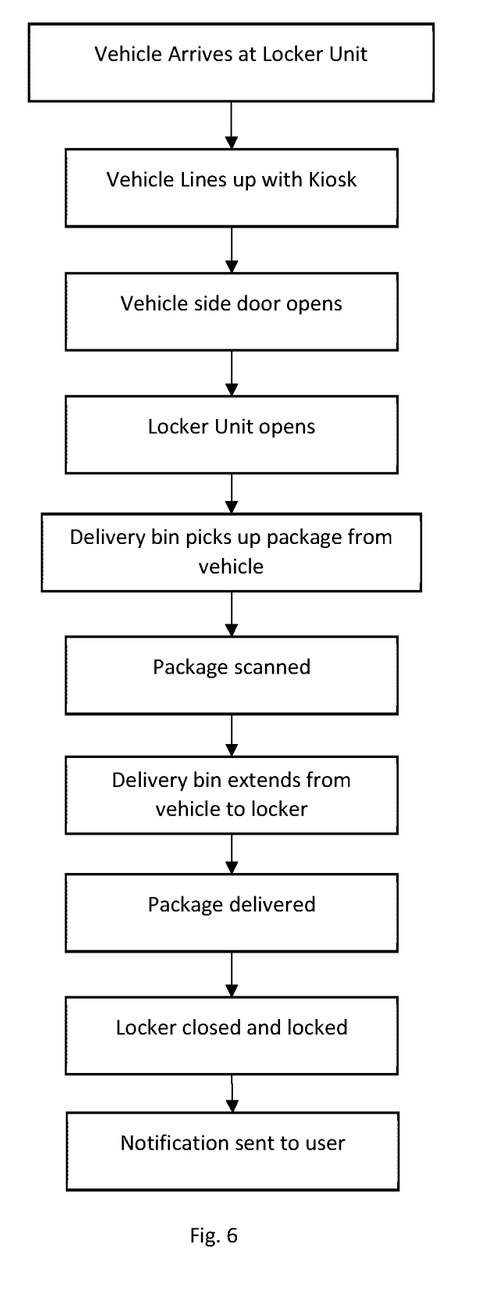
FIG. 6 is a chart showing the process of delivering packages to the locker unit.

The diagram of FIG. 6 shows the process of delivering packages to a locker unit 200 in certain embodiments. The delivery vehicle 100 may depart the loading facility 400 and deliver the packages autonomously or semi autonomously according to the delivery vehicles' predetermined route. When the delivery vehicle 100 recognizes and arrives to the delivery vehicles' first locker unit 200, the vehicle may stop in front of the locker. There may be a unique identifier to assist the autonomous vehicle to recognize the location provided by one or more of the vehicle's onboard cameras. For example, there may be an image posed on the locker with a unique graphic pattern designed to mark location of the locker. An image processing and pattern recognition algorithm may be used to recognize and locate the locker, and to guide the delivery vehicle to the correct loading/unloading position relative to the locker. Once the vehicle has arrived, the delivery vehicles engages the delivery vehicles' self-leveling device to ensure the vehicle is lined up properly with the locker.

Next, the delivery vehicle 100 may open the rolling doors at the side and the locker 200 may open one or two of the locker units' compartment doors 212. The delivery vehicle 100 may send information to the locker unit 200 via wireless device containing package and locker information and request the locker unit 200 to unlock and open one or two of the locker units' compartment doors 212 in sequence to allow the system to unload specific packages. The locker unit 200 may communicate to the delivery vehicle 100 the packages the locker unit has to be collected.

Next, the delivery vehicle 100 may extend the delivery and collection bin 130 from the vehicle into one of the locker compartments 210 to either deliver a package. The bin 130 may be equipped with a motorized conveyor to assist in delivery or collection. As the package is being delivered, the delivery vehicle 100 scans the package and marks it as delivered. After the package has been delivered, the locker unit 200 may close and lock its compartment doors 212 and a notification will be sent to the consumer.

Figure 7:
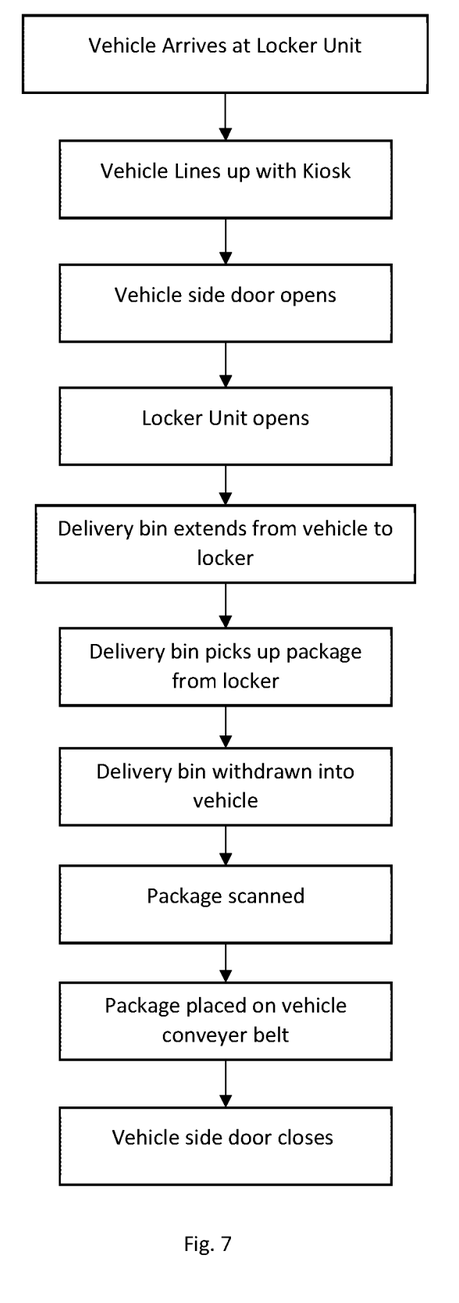
FIG. 7 is a chart showing the process of collecting packages from the locker unit.

The diagram of FIG. 7 shows the process of collecting packages from a locker unit 200 in certain embodiments. After the delivery vehicle 100 arrives to the locker unit 200, the vehicle may stop in front of the locker. The delivery vehicle engages the deilvery vehicles' self-leveling device to ensure the vehicle is lined up properly with the locker. Next, the delivery vehicle 100 may open the rolling doors at the side and the locker 200 open one or two of the locker units' compartment doors 212. Next, the delivery vehicle 100 may extend the delivery and collection bin 130 from the vehicle into one of the locker compartments 210 to collect a package. The delivery bin 130 may have a beveled end and a conveyor belt that allows the delivery/collection bin to slide underneath the package and retrieve the package.

After the package has been scooped up and the conveyor belt assists in grabbing the package, the delivery and collection bin 130 may retract back into the vehicle. As the bin is retracting with the package, the locker unit may scan the package marking the package as picked up and will electronically close the locker door and lock the locker units' compartment door. Next the locker unit or delivery collection vehicle may send notification to locker owner that package has been picked up. After the delivery and collection bin 130 retracts fully into the vehicle to the delivery and collection bins' original starting position, the packages may be loaded onto the vertical lift to be placed and stored in the rack system. Once on the vertical lift, a pusher bar may be engaged hydraulically and push the package into a dedicated return package location on the conveyor rack system. Later, the packages placed in the dedicated return package location will be delivered to the shipping company, manufacturer or retailer. Next, the delivery vehicle 100 may close the rolling doors on the side. Then the delivery vehicle 100 may queue the leveling system to retract the stabilizers and return to original starting positions allowing the vehicle to move freely onto the delivery vehicles' next destination.

For unloading, the delivery vehicle 100 returns to the delivery vehicles' point of origination at the central collection facility 400. Once queued, the delivery vehicle 100 may open the doors to the rear of the vehicle and engages the delivery vehicles' return package bin conveyor system to sequentially unload the packages.

During the delivery and collection processes described above, the delivery vehicle 100 may communicate with the locker unit 200 via their wireless communication units. Both the delivery vehicle 100 and the locker unit 200 may route information into the server 300 to be processed by the server software 350. The server software 350 may interface with shipping companies, manufacturers and retailers to present them the delivery, collection, size and weight and routing information of the packages. The server software 350 may also communicate with the consumer to send notifications of packages received or delivered and to collect payments from the customers using this system.

The foregoing description and accompanying drawings illustrate the principles, preferred or example embodiments, and modes of assembly and operation, of the invention; however, the invention is not, and shall not be construed as being exclusive or limited to the specific or particular embodiments set forth hereinabove.

What is claimed is:

1. An autonomous package handling system for collecting and delivering packages, comprising:
    a locker unit comprising:
    a compartment;
    a door having an electronic closing and opening mechanism;
    an electronically controlled lock;
    a locker wireless unit for communicating with a server; and
    a locker unit base;
    an autonomous delivery vehicle comprising:
        a motorized conveyor rack, the motorized conveyor rack including a plurality of horizontal conveyors supported by a plurality of support beams;
        a collection bin for temporarily holding the packages;
        a vertical lift to move the collection bin between the plurality of horizontal conveyors;
        a wireless device which transmits information to control the locker unit to unlock, lock, open and close;
        a rolling door at the side of the autonomous delivery vehicle which is configured to open and close; and
        a collection bin conveyor with a beveled end to slide under a package which extends through the open rolling door configured to extend and retract the collection bin from and back to an interior of the autonomous delivery vehicle; and
    a self-leveling device which aligns the autonomous delivery vehicle with the locker unit such that the collection bin conveyor reaches the door of the locker unit.

2. The autonomous package handling system according to claim 1, wherein the locker unit further comprises a roof disposed on top of the locker unit, wherein:
    the roof provides a housing space; and
    the roof is configured with a hinge that allows the roof to be partially opened for a user to access the housing space.

3. The autonomous package handling system according to claim 2, wherein the locker unit further comprises:
    one or more solar panels disposed on the roof.

4. The autonomous package handling system according to claim 1, wherein the locker unit base includes a tank configured to hold water and a lid configured to cover the tank.

5. The autonomous package handling system according to claim 4, wherein the tank includes a draining aperture for draining water from the tank and a plug to seal and unseal the draining aperture.

6. The autonomous package handling system according to claim 4, wherein:
    the lid of the lock unit base includes a plurality of threaded tubes; and
    one of the threaded tubes is configured to fit a hose to fill the locker unit base with water.

7. The autonomous package handling system according to claim 1, wherein the locker unit further comprises a level indicator and a mechanism for manually adjusting a level of the locker unit.

8. The autonomous package handling system according to claim 7, wherein the level indicator is a bubble level.

9. The autonomous package handling system according to claim 7, wherein the mechanism for manually adjusting the level of the locker unit comprises a plurality of threaded shafts extended from a bottom of the locker unit and a plurality of adjustment nuts respectably marched to the threaded shafts.

10. The autonomous package handling system according to claim 1, wherein the locker unit further comprises a keypad to control the electronic lock.

11. The autonomous package handling system according to claim 1, wherein the locker unit further comprises a barcode/QR code scanner.

12. The autonomous package handling system according to claim 1, wherein the locker unit further comprises a refrigeration system.

13. The autonomous package handling system according to claim 1, wherein the autonomous delivery vehicle further comprises a hydraulic push bar configured to push a package into a dedicated return package location on the conveyor rack system.

14. The autonomous package handling system according to claim 1, wherein the autonomous delivery vehicle further comprises a barcode/QR code scanner.

15. A method for autonomously collecting and delivering packages, comprising:

using a self-leveling device to align an autonomous delivery vehicle with a locker unit such that a collection bin conveyor of the autonomous delivery vehicle reaches a door of the locker unit;

controlling a rolling door at a side of the autonomous delivery vehicle to open;

sending a wireless signal from a wireless unit of autonomous delivery vehicle to control unlocking an electronically controlled lock of the locker unit and opening an electronically controlled locker door of the locker unit;

operating a motorized conveyor rack of the autonomous delivery vehicle to move a package, the motorized conveyor rack including a plurality of horizontal conveyors supported by a plurality of support beams;

operating a vertical lift of the autonomous delivery vehicle to move the collection bin between the plurality of horizontal conveyors;

controlling a collection bin conveyor with a beveled end to slide under the package and to extend the collection bin from an interior of the autonomous delivery vehicle into a compartment of the locker unit; and controlling the collection bin conveyor to retract the collection bin back to the interior of the autonomous delivery vehicle after the package is placed in the compartment of the locker unit.

* * * * *